United States Patent
Petri et al.

(10) Patent No.: US 11,483,299 B2
(45) Date of Patent: Oct. 25, 2022

(54) METHOD AND APPARATUS FOR ENCRYPTED COMMUNICATION

(71) Applicant: Arm Limited, Cambridge (GB)

(72) Inventors: Gustavo Federico Petri, Cambridge (GB); Guilhem Floreal Bryant, Cambridge (GB); Nicholas Costas Spinale, Cambridge (GB)

(73) Assignee: Arm Limited, Cambridge (GB)

( * ) Notice: Subject to any disclaimer, the term of this patent is extended or adjusted under 35 U.S.C. 154(b) by 210 days.

(21) Appl. No.: 17/076,112

(22) Filed: Oct. 21, 2020

(65) Prior Publication Data

US 2022/0124074 A1 Apr. 21, 2022

(51) Int. Cl.
*H04L 9/40* (2022.01)
*H04L 9/32* (2006.01)

(52) U.S. Cl.
CPC ........ *H04L 63/0485* (2013.01); *H04L 63/166* (2013.01); *H04L 63/20* (2013.01)

(58) Field of Classification Search
CPC .... H04L 63/0485; H04L 63/166; H04L 63/20
USPC ........................................................ 713/151
See application file for complete search history.

(56) References Cited

U.S. PATENT DOCUMENTS 9,509,502 B2 * 11/2016 Schulz ................. H04L 63/062
9,876,823 B2 * 1/2018 Smith ..................... H04L 9/088
2005/0030921 A1 * 2/2005 Yau .......................... H04L 45/00
   370/349
2013/0145461 A1 * 6/2013 Barton ................... H04W 12/12
   726/22
2017/0005989 A1 * 1/2017 Jia ........................... H04L 67/56
2018/0310157 A1 * 10/2018 Pan ....................... H04W 40/24
2020/0304477 A1 9/2020 Venkataraman

OTHER PUBLICATIONS

Kim, Seongmin; Ha, Jaehyung; Kim, Taesoo; Han, Dongsu; "A First Step Towards Leveraging Commodity Trusted Execution Environments for Network Applications", Proceedings of the 14th ACM Workshop on Hot Topics in Networks, Hotnets-XIV, Jan. 1, 2015, pp. 1-7, New York, New York, USA.

(Continued)

*Primary Examiner* — Michael S McNally
(74) *Attorney, Agent, or Firm* — Quinn IP Law

(57) ABSTRACT

Systems, methods, and hardware devices for routing traffic between first and second electronic devices are arranged such that anonymities of the first and second electronic devices are maintained. This includes coupling the first and second electronic devices to a network having a plurality of routers, each of which includes a trusted execution environment (TEE) circuit. Each TEE includes a secure routing protocol, a routing table, and an attestation circuitry. Cryptographically secured channels are formed between pairs of the routers that terminate at the TEE. Each of routers executes an attestation procedure, and an ad hoc path is generated within the network based upon the secure routing protocol, the routing table, and the attestation procedure, wherein the ad hoc path includes a subset of the plurality of routers of the network. Traffic is routed between the first electronic device and the second electronic device via the ad hoc path.

20 Claims, 3 Drawing Sheets

(56) References Cited

OTHER PUBLICATIONS

Diab Tayeb, Gilg Marc, Drouhin, Frederic, Lorenz Pascal: "Anonymizing Communication in VANets by Applying I2P Mechanisms", 2019 IEEE Global Communications Conference; (GLOBECOM), IEEE, Dec. 9, 2019, pp. 1-6.
Jean-Marc Robert et al: "A Proactive Routing Protocol for Wireless Ad Hoc Networks Assuring Some Privacy", Hot Topics on Wireless Network Security and Privacy, ACM, New York, NY, Apr. 19, 2013, pp. 25-30.
Yanchao Zhang, Wei Liu, Wenjing Lou, "Anonymous Communications in Mobile ad hoc Networks", 24th Annual Joint Conference of the IEEE Computer and Communications Societies. Miami, FL, USA Mar. 13-17, 2005, vol. 3, Mar. 13, 2005, pp. 1940-1951.

\* cited by examiner

METHOD AND APPARATUS FOR ENCRYPTED COMMUNICATION

INTRODUCTION

The present technique relates to the field of privacy in computer communication, in particular communication between two endpoint devices via an intervening network, wherein it may be desirable for a source and a destination to be anonymous to the network.

Present communication protocols protect anonymities of a source and a destination by routing traffic, wrapped in multiple layers of transportation layer security (TLS) encryption, through untrusted relay nodes on a pre-established path through a network of routers. Such communication protocols allow users to mask their identities, specifically the source and destination addresses, over a path through a network by leveraging cryptographic protocols to encapsulate traffic of the end users. This includes pre-establishing a path including at least three relay nodes that are employed to deliver traffic from a certain source to a destination address. Limitations of such a communication protocol include that the path through the network has to be pre-established, and that the source of the traffic has to encrypt the traffic using several different keys that have been previously negotiated through TLS with each of the relay nodes in the path. This adds resource cost, which may be significant for resource-constrained devices.

It is desirable to provide a system for establishing anonymous communications between devices that does not require generating a pre-established path through a network of routers.

SUMMARY

The concepts described herein relate to systems, methods, and hardware devices for routing traffic between a first electronic device and a second electronic device that are arranged such that anonymities of the first and second electronic devices are maintained, i.e., such that identities and locations of the first and second electronic devices are not traceable. This includes coupling the first electronic device and the second electronic device to a network, the network having a plurality of routers, wherein each of the plurality of routers of the network includes a trusted execution environment (TEE), and wherein each of the TEEs includes a secure routing protocol, a routing table, and an attestation circuitry. A plurality of cryptographically secured channels are formed, wherein each of the cryptographically secured channels is formed between individual pairs of the plurality of routers, wherein each of the cryptographically secured channels terminates at the TEE of each of the routers for each of the individual pairs of the plurality of routers. For each of the plurality of routers of the network, an attestation procedure is executed via the attestation circuitry of the TEE, and an ad hoc path is generated within the network between the first electronic device and the second electronic device based upon the secure routing protocol, the routing table, and the attestation procedure for each of the plurality of routers of the network. Traffic is routed between the first electronic device and the second electronic device via the ad hoc path within the network, wherein the ad hoc path includes a subset of the plurality of routers of the network and a subset of the plurality of cryptographically secured channels.

An aspect of the disclosure includes a system for routing traffic between a first electronic device and a second electronic device that includes a network, including a plurality of routers configured to communicate with the first electronic device and the second electronic device. Each of the plurality of routers includes a trusted execution environment (TEE), wherein the TEE includes a secure routing protocol, a routing table, and an attestation circuitry. A cryptographically secured channel is formed between individual pairs of the plurality of routers, wherein each of the cryptographically secured channels terminates at the TEE of the respective router for each of the individual pairs of the plurality of routers, wherein the attestation circuitry of the TEE executes, for each of the plurality of routers of the network, an attestation procedure. An ad hoc path is generated within the network between the first electronic device and the second electronic device based upon the secure routing protocol, the routing table, and the attestation procedure for each of the plurality of routers of the network. The ad hoc path includes a subset of the plurality of routers of the network, and the traffic is routed between the first electronic device and the second electronic device via the ad hoc path within the network. As such, relay nodes of the overlay network are hosted within the TEEs of the plurality of routers.

Another aspect of the disclosure includes a router, having a trusted execution environment (TEE) with a secure routing protocol, a routing table, and an attestation circuitry. The attestation circuitry of the TEE executes an attestation procedure. The router is one of a plurality of routers that form a network, wherein a cryptographically secured channel is formed between the router and another of the plurality of routers, and wherein the cryptographically secured channel terminates at the TEE of the router. As such, the TEE of the router serves as a host for a relay node for a trusted overlay routing network.

The use of Trusted Execution Environments (TEEs) facilitates anonymous routing of network traffic over an untrusted network, including employing an overlay network wherein relay nodes are hosted within TEEs. This relies on attestation and memory encryption to protect against malicious relay routers, and precludes the need to pre-establish a path through a network.

The above summary is not intended to represent every possible embodiment or every aspect of the present disclosure. Instead, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings.

Figure 1:
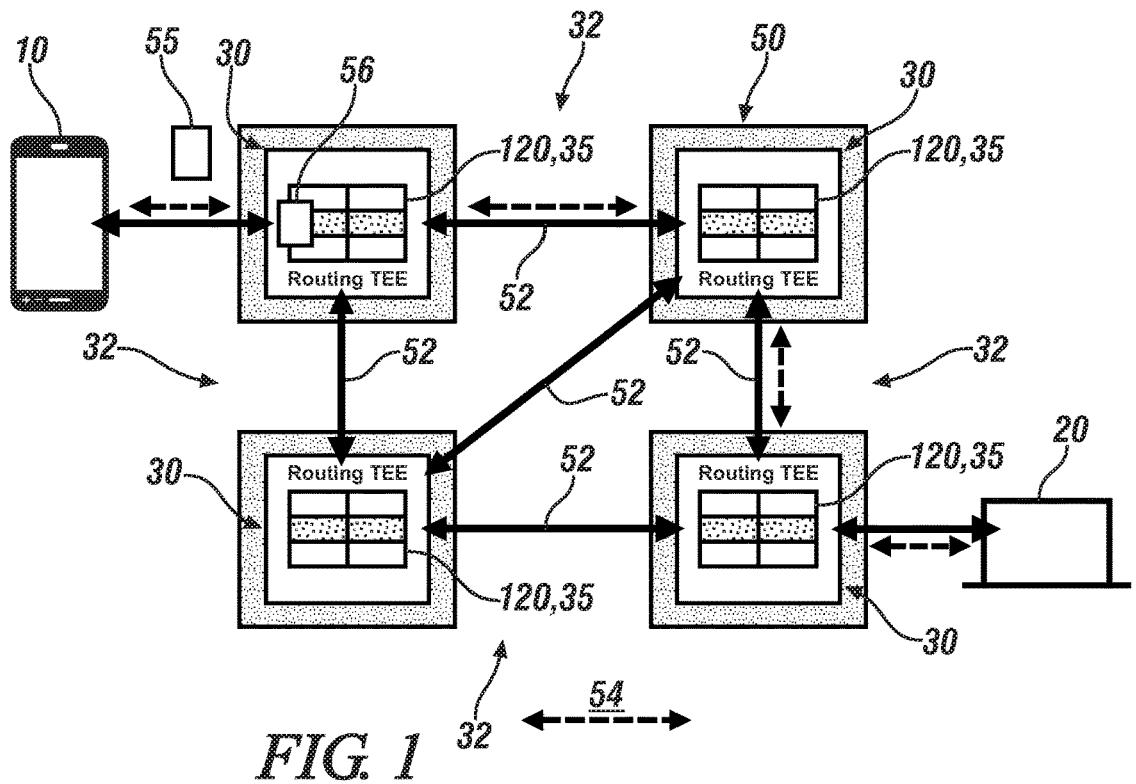
FIG. 1 shows, in block diagram form, a schematic illustration of a first electronic device that is arranged to anonymously communicate with a second electronic device via an ad hoc path that is formed in a network that includes a multiplicity of routers, wherein each of the routers includes a Trusted Execution Environment (TEE), in accordance with the disclosure.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein.

The concepts described herein relate to systems, methods, and hardware devices for routing traffic between a first electronic device and a second electronic device over an ad hoc path that is formed through a network of routers. The ad hoc path is arranged such that anonymities of the first and second electronic devices are maintained, i.e., such that identities and locations of the first and second electronic devices are not traceable. As described herein, this is accomplished by a network of routers that each employ a hardware-supported Trusted Execution Environment (TEE). Each of the TEEs has an attestation procedure for establishing the integrity of the code being executed in the TEE for remote peers, and a runtime for executing the code in a privacy-preserving fashion. The TEEs prevent the operating system (OS), hypervisor, etc. from observing the secret contents being manipulated by code running within the respective TEE. Hardware security architectures can provide such operation.

A secure routing protocol is developed and executed in each of the TEEs, which can attest to peer routers, hence forming a "trusted overlay routing network". As employed herein, the term "secure" indicates that the routing program executing in the TEE does not expose either its routing decisions in the form of routing tables, etc., or the source and destination addresses of the traffic under execution. Each of the TEEs establishes TLS connections to its peer TEEs, which is facilitated by the TLS channels being terminated inside the TEE and thus preventing the OS, hypervisor, etc. from inspecting the traffic between them. The peer TEEs are able to discover each other and cooperate to define the ad hoc path. The routing code is trusted because it can be attested to and verified. Because the TEE routing program is trusted, a client of the network in the form of an electronic device for which anonymity is to be ensured can reveal the source and destination addresses, without risk that the source and destination addresses will be revealed outside of the TEE environment. A consequence of this design is that the communication endpoints do not need to be pre-established in a network, or encrypt traffic with multiple keys, or rely on a trusted directory to join the network. This in turn means that the cost for the endpoints, in terms of computation and time to establish a network, is reduced, while preserving or increasing the same level of anonymity.

Referring to the drawings, wherein like reference numerals correspond to like or similar components throughout the several Figures, FIG. 1, consistent with embodiments disclosed herein, illustrates a first electronic device 10 that is arranged to anonymously communicate with a second electronic device 20 via an ad hoc path 54 that is formed in a network 50 that includes a multiplicity of routers 30, four of which are illustrated. The first and second electronic devices 10, 20 may include hand-held devices, e.g., cellphones or tablets, on-vehicle devices, desktop computers, laptop computers, gaming stations, media player, workstations, servers, or other computing devices.

The routers 30 of the network 50 may be located in one or multiple geographic areas, one or multiple political entities, one or multiple corporate entities, one or multiple private entities, one or multiple academic entities, etc.

The first electronic device 10 and the second electronic device 20 are coupled to the network 50. The first electronic device 10 is able to route traffic 55 in the form of one or multiple information packets to the second electronic device 20 via the ad hoc path 54 that is a subset of the plurality of routers 30 that form the network 50. As described herein, the network 50 is arranged such that anonymities of the first and second electronic devices 10, 20 are maintained, i.e., such that identities and locations of the first and second electronic devices 10, 20 are not traceable.

As illustrated with reference to FIG. 2, each of the routers 30 of the network 50 forms a node 35 of the network 50, and includes a processor core 102 and associated storage that provides a physical location for a trusted execution environment (TEE) 120. Each TEE 120 is a secure area within the controller that includes a secure routing protocol 122, a routing table 124, and an attestation circuit 126 that executes an attestation procedure.

Referring again to FIG. 1, a cryptographically secured channel 52 is formed between individual pairs of the routers 32, wherein each cryptographically secured channel 52 terminates at the TEE 120 of each of the routers 30 for each of the individual pairs of the routers 32. In one embodiment, the cryptographically secured channel 52 is configured as a transportation layer security (TLS) channel 52. Each of the cryptographically secured channels 52 has an individual session-key spanning its endpoints. Furthermore, each of the TEEs 120 has includes the routing table 124 that is employed to route the traffic 55. Furthermore, each of the TEEs 120 may have one or a plurality of configurable policies 56 that are associated with routing of the traffic 55. The establishment of the ad hoc path 54 that is formed in the network 50 that includes the TEEs 120 associated with the multiplicity of routers 30 provides a secure communication channel that preserves anonymity of the identities and locations of the first and second electronic devices 10, 20, which may be beneficial to constrained devices such as hand-held cell phones, etc. Alternatively, a single cryptographically secured channel can be established for the ad hoc path 54 by sharing a single symmetric-key or using a Pre-Shared Key (PSK).

The attestation circuit 126 of the TEE 120 executes an attestation procedure. An example attestation procedure is described with reference to FIG. 6.

Referring again to FIG. 1, an ad hoc path 54 composed of a subset of the routers 30 is generated within the network 50 between the first electronic device 10 and the second electronic device 20 based upon the secure routing protocol 122, the routing table 124, and the attestation procedure for each of the TEEs 120 associated with the routers 30 of the network 50. The traffic 55 is routed between the first electronic device 10 and the second electronic device 20 via the ad hoc path 54 within the network 50. The traffic 55 may be subjected to one or a one or multiple configurable policy(ies) 56, with the generation of the ad hoc path 54 being based upon the configurable policy(ies) 56. In one embodiment, one or multiple configurable policy(ies) 56 is resident in and introduced by one of the TEEs 120 of one of routers 30. Alternatively, one or multiple configurable policy (ies) 56 is resident in and introduced by multiple ones of the TEEs 120 of one of routers 30. Alternatively, or in addition, one or multiple configurable policy(ies) 56 is an element of the traffic 55. Alternatively, or in addition, one or multiple configurable policy(ies) 56 is resident in and introduced by one of the first and second electronic devices 10, 20. The configurable policies 56 may treat and manage different traffic 55 differently based upon configurable policy(ies) that are specific to the traffic 55.

In one embodiment, the configurable policy 56 is a geographic-specific policy associated with the plurality of routers 30, wherein the generation of the ad hoc path 54 is based upon the geographic-specific policy. In one embodiment, the geographic-specific policy is in the form of an exclusion policy to avoid any of the plurality of routers that are located within borders of a selected country or political entity, with the generation of the ad hoc path 54 being based upon the exclusion policy.

In another embodiment, the configurable policy 56 is a geographic-specific policy associated with the plurality of routers 30, wherein the generation of the ad hoc path 54 is based upon the geographic-specific policy. In one embodiment, the geographic-specific policy is in the form of an inclusion policy to employ only a subset of the plurality of routers 30 that are located within borders of a selected one or more countries or political entities, with the generation of the ad hoc path being based upon the inclusion policy.

In another embodiment, the configurable policy 56 is a quantity policy associated with a minimum quantity of the routers 30 or maximum quantity of the routers 30, wherein the generation of the ad hoc path 54 is further based upon the quantity policy.

In another embodiment, the configurable policy 56 is a randomization policy associated with a route randomization protocol, wherein the generation of the ad hoc path 54 is based upon the route randomization protocol.

In another embodiment, the configurable policy 56 is an entity-specific policy associated with a subset of the plurality of routers 30 that are associated with a specific entity, wherein the generation of the ad hoc path 54 is based upon the entity-specific policy.

In another embodiment, the entity-specific policy associated with the routers 30 is a first association policy to employ only a subset of the plurality of routers 30 that are associated with the specific entity, wherein the generation of the ad hoc path 54 is based upon the first association policy.

In another embodiment, the entity-specific policy associated with the routers 30 is a second association policy to employ only a subset of the plurality of routers 30 that are not associated with a specific entity, wherein the generation of the ad hoc path 54 is based upon the second association policy.

Figure 2:
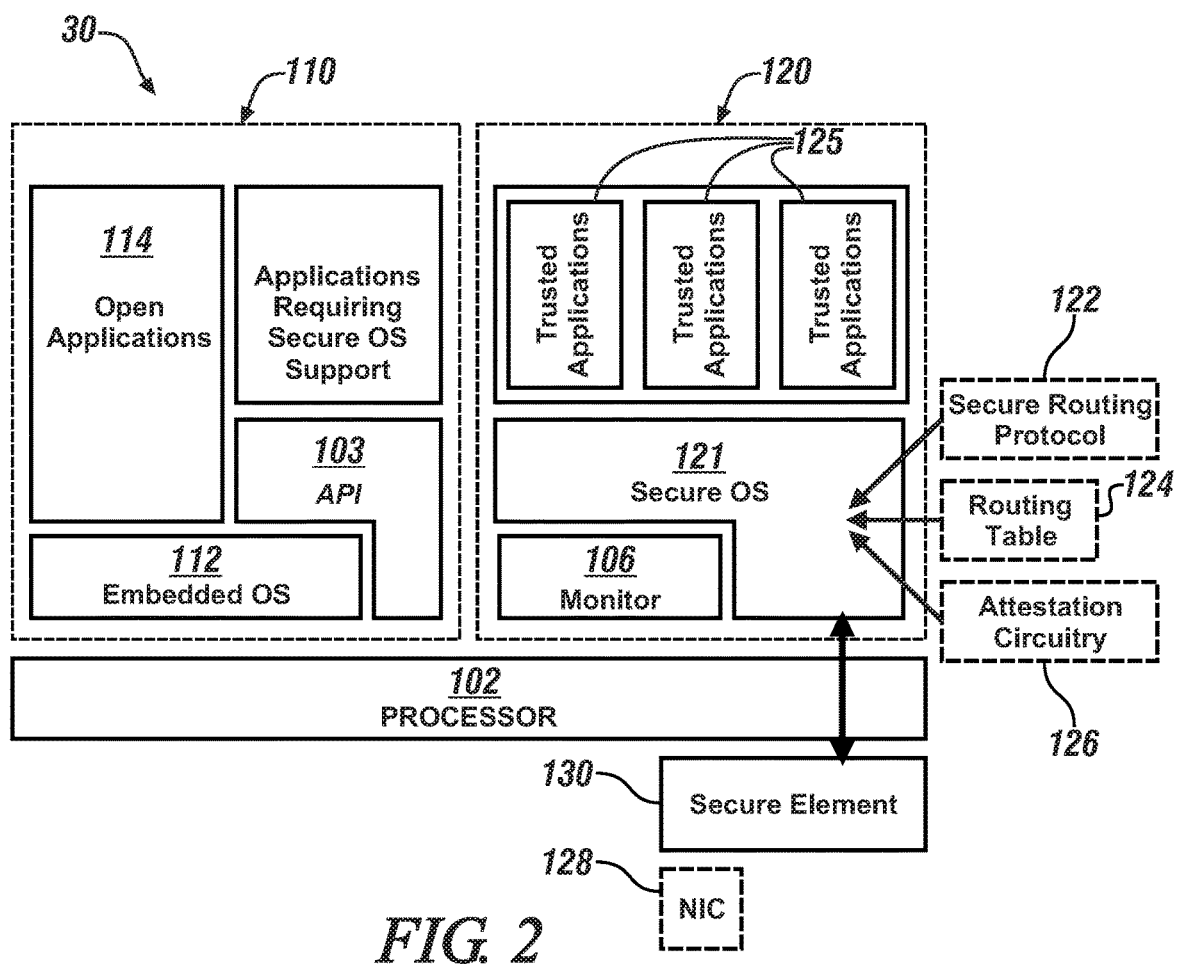
FIG. 2 schematically shows details related to one of the routers, in accordance with the disclosure.

FIG. 2 schematically shows details related to one of the routers 30. The router 30 includes a processor core 102 including storage, a secure element 130, and a Network Interface Controller (NIC) 128 to effect communication. The processor core 102 including storage is configured to include a Rich Execution Environment (REE) 110, a Trusted Execution Environment (TEE) 120, and an Application Programming Interface (API) 103. The processor core 102 provides two virtual cores, one being considered non-secure and associated with REE 110, the other being secure and associated with TEE 120. A monitor 106 is a mechanism that is configured to context switch between the TEE 120 and the REE 110.

The NIC 128 may include electronic circuitry to send/receive data wirelessly and/or via a cable, e.g., Ethernet, optical channel, etc. In examples, the NIC 128 is implemented as a smart MC configured to perform various operations, such as encryption/decryption, controlling the traffic, e.g., steering the traffic, implementing a firewall, reporting traffic flow, etc. The NIC 128 may perform such operations independently of operations performed by the processor core 102.

The secure element 130 includes secure resources, including, e.g., hardware (HW) Keys, a secure storage, a trusted user interface, e.g., a keypad and screen, crypto-accelerators, etc.

The REE 110 includes software that is stored in a portion of the storage and is executed in a portion of the processor core 102, including a main operating system (OS) 112, and one or a plurality of user-installed applications (apps) 114, such as weather applications, communication, street maps, etc. The REE 110 employs a portion of the processor core 102 and associated storage to download and execute the user-installed apps 114.

The TEE 120 includes software that is stored in an isolated portion of the storage, is executed in an isolated area inside the processor core 102, and includes a secure OS 122. The TEE 120 runs in an isolated environment in parallel with the main OS 112, which guarantees that the code and data loaded in the TEE 120 are protected with respect to confidentiality and integrity. The arrangement of the TEE 120 uses both hardware and software to protect data and software code. The TEE 120 may include and execute a plurality of trusted applications 125, which may include, e.g., a digital media app, a secure payment app, a corporate app, etc. The secure OS 121 includes the secure routing protocol 122, the routing table 124, and the attestation circuit 126. The trusted applications 125 have access to the full power of the processor core 102 and associated storage, with the hardware isolation protecting the components of the TEE 120 from the user-installed apps 114 that are running in the main OS 112. Software and cryptographic isolations inside the TEE 120 protect the trusted applications 125 from interacting with each other. The TEE 120 effects communication to another TEE via the NIC 128.

Examples of the TEE 120 may include, for example, the Arm TrustZone. The functioning of the TEE 120, and computer program instructions and data loaded inside, are configured to be trusted by endpoint devices, e.g., the first and second electronic devices 10, 20, even if the router 30 taken as a whole cannot be trusted. The functioning can be partially isolated from the functioning of other functional units of the router 30. The trust in the TEE 120 can be provided by way of an attestation protocol.

The TEE 120 executes computer instructions to determine a cryptographic session key associated with a communication session, and to use the session key to decrypt content of encrypted messages transmitted between the first electronic device 10 and the second electronic device 20 via the ad hoc path 54 through the network 50 that includes the plurality of routers 30, and to analyze the decrypted content. The encrypted messages can be read, and actions taken based on the content thereof within the TEE 120. This can be performed without compromising the privacy of the communication channel, because the first and second electronic devices 10, 20 can trust the functioning of the plurality of TEEs 120 associated with the ad hoc path 54 through the network 50 and the computer program instructions that are executed.

In an example, the TEE 120 includes the attestation circuit 126, which is configured to perform an attestation process that may include computer instructions to be executed by the TEE 120 and initial data associated with the TEE 120. The attestation process provides a way for the first and second electronic devices 10, 20 to trust that each of the associated TEEs 120 in the ad hoc path 54 is functioning as expected, even if one of the routers 30 as a whole is not trusted.

The attestation process may include receiving, from one of the first electronic device 10 or the second electronic device 10, an attestation request message. Responsive to the attestation request message, the attestation process may include transmitting to one of the first electronic device 10 and the second electronic device 20 an attestation token for verification. For example, the attestation token may be provided to an attestation service to be verified by the attestation service, after which an attestation confirmation can be provided from the attestation service to the respective one of the first and second electronic devices 10, 20. This provides an effective way of performing the attestation process by way of a trusted third party attestation service, which may for example be provided by the manufacturer of the TEE 120. Alternatively, the attestation token may be verified by the respective one of the first and second electronic devices 10, 20. In some examples, the attestation token includes a cryptographic hash of the aforementioned computer instructions and/or a cryptographic hash of the aforementioned initial data. This provides a mechanism for providing trust that the instructions and/or initial data are as expected, and have not been modified.

In an example, the TEE 120 is configured to disallow unencrypted transmission of the decrypted content of the encrypted messages outside of the TEE 120. Alternatively, or additionally, the TEE 120 may be configured to disallow transmission of the session key outside of the TEE 120. This allows the security of the encrypted communication channel between the first and second electronic devices 10, 20 to be maintained, because untrusted entities do not have access to decrypted message content or to the session key. Similarly, the TEE 120 is configured to protect the computing instructions executed by the TEE 120 from modification by untrusted computing instructions that may be executed by the router 30. These aspects of functionality may be defined within the computer program instructions to be executed by the TEE 120, and thus can be assured by way of the attestation protocol.

The first and second electronic devices 10, 20 are arranged to communicate by way of the ad hoc path 54, which is an end-to-end encrypted communication channel, with an associated session key which is used to encrypt and decrypt messages transmitted on the ad hoc path 54. The TEE 120 acquires this session key, for example as part of a handshake process as described with reference to FIGS. 3 and 4. The TEE 120 can use this session key to decrypt messages transmitted between the first and second electronic devices 10, 20, and thereby obtain decrypted (plaintext) message content. Based on this content, the TEE 120 can apply a filtering policy to determine whether a given message should be transmitted from the router 30 to the recipient, or whether it should be blocked. Message-content-specific filtering can thus be applied within an end-to-end encrypted communication channel, without any untrusted entity having access to plaintext message content. Example filtering policies include filters based on message blacklists, forbidden message formats and prevention of leaking of classified content.

Figure 3:
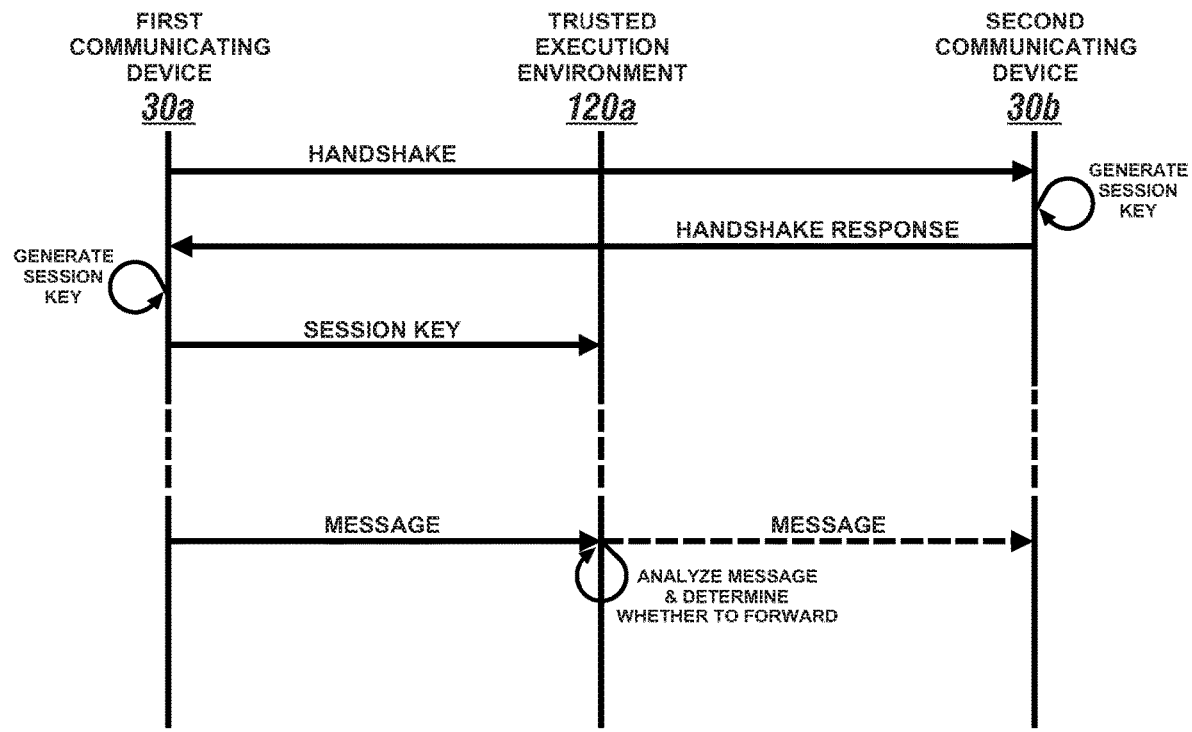
FIG. 3 graphically shows details related to a first router transmitting a handshake message to a second router, in accordance with the disclosure.
Figure 4:
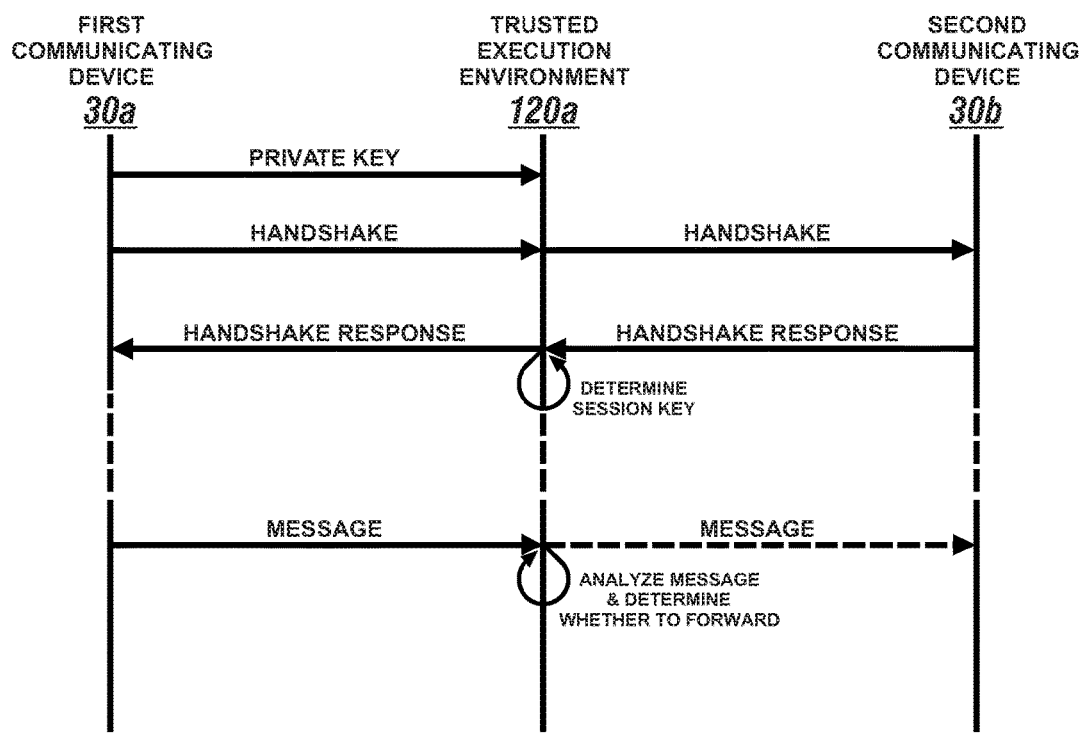
FIG. 4 schematically shows details related to a first router transmitting a private encryption key for establishing communication with a second router via a TEE, in accordance with the disclosure.

FIGS. 3 and 4 graphically show methods for providing one of the TEEs 120 with a session key. A first TEE 120*a* that is associated with a first communication device 30*a* is seeking to communicate with a second TEE 120*b* that is associated with a second communication device 30*b* via a cryptographically secured channel 52. The first communication device 30*a* may be a router or an electronic device, and the second communication device 30*b* may be a router or an electronic device, analogous to the router 30 or the first and second electronic devices 10, 20 that are described with reference to FIG. 1.

FIG. 3 graphically shows details related to the first communication device 30*a* transmitting a handshake message to the second communication device 30*b*. This handshake message is transmitted without modification and without filtering. The purpose of the handshake message is to begin establishment of an end-to-end encrypted communication channel through the cryptographically secured channel 52. The second communication device 30*b* generates a session key for the cryptographically secured channel 52, based on content of the handshake message. The handshake message may include a series of random bytes generated by the first communication device 30*a*.

The second communication device 30*b* transmits a handshake response message to the first communication device 30*a*. This handshake response message is transmitted without modification and without filtering.

The first communication device 30*a* generates the session key for the cryptographically secured channel 52 based on the content of the handshake response message. The session key may be, for example, a series of random bytes generated by the second communication device 30*b* and used by the second communication device 30*b* to determine the session key. Both first and second communication devices 30*a*, 30*b* use the same algorithm and the same input data to determine the session key, so that they both arrive at the same session key. This session key can then be used to encrypt and decrypt messages for transmission between the first and second communication devices 30*a*, 30*b*, and thus the cryptographically secured channel 52 can be considered established.

The first communication device 30*a* provides the session key, through a secure channel, to the first TEE 120*a*. Alternatively, the second communication device 30*b* may provide the session key to the first TEE 120*a*. Once it has received the session key, the first TEE 120*a* is able to decrypt encrypted messages transmitted between the first and second communication devices 30a, 30b.

At a later time, the first communication device 30a transmits a message to the second communication device 30b. The first TEE 120a uses the session key to decrypt the message and analyze its plaintext content. Based on this, the first TEE 120a determines whether or not the message should be forwarded to the second communication device 30b. The message is then forwarded if appropriate. The decryption and analysis are performed entirely within the first TEE 120a, so that untrusted components of the first communication device 30a do not have access to any plaintext message content.

FIG. 4 schematically shows details related to the first communication device 30a transmitting a private encryption key for establishing communication with the second communication device 30b via the first TEE 120a. The first communication device 30a transmits the handshake message to the second communication device 30b. The second communication device 30b responds with a handshake response message. The handshake message and handshake response message are similar to those discussed above with reference to FIG. 3. Because the first TEE 120a has the private key of the first communication device 30a, it can extract the content of the handshake and handshake response messages, and thereby determine the session key using the same algorithm that is used by the first and second communication devices 30a, 30b to determine the session key.

At a later time, the first TEE 120a can analyze messages transmitted between the first and second communication devices 30a, 30b and determine whether or not they should be forwarded, as described above with reference to FIG. 3.

The method of FIG. 4 therefore does not rely on the first TEE 120a being able to identify the handshake and handshake response messages and forward them without extracting their content, as is the case for FIG. 3. The method of FIG. 4 also, as a consequence of allowing key-sharing and attestation prior to establishment of a communication session, can be implemented without modification of endpoint applications. However, the method of FIG. 4 does include a transmission of the private key of the first communication device 30a to the first TEE 120a, which may violate some security protocols. As a partial mitigation of this, the private key provided by the first communication device 30a could be a temporary key derived from an initial private key which is not transmitted outside the first communication device 30a.

Referring again to FIG. 1, the handshake process to establish a communication session as described with reference to FIGS. 3 and 4 may be employed by each of the routers 30 in each of the pairs of the routers 32 that are part of the ad hoc path 54 that is formed in the network 50, and may also be employed by one of the first or second electronic devices 10, 20 and one of the routers 30 that are part of the ad hoc path 54 that is formed in the network 50.

Figure 5:
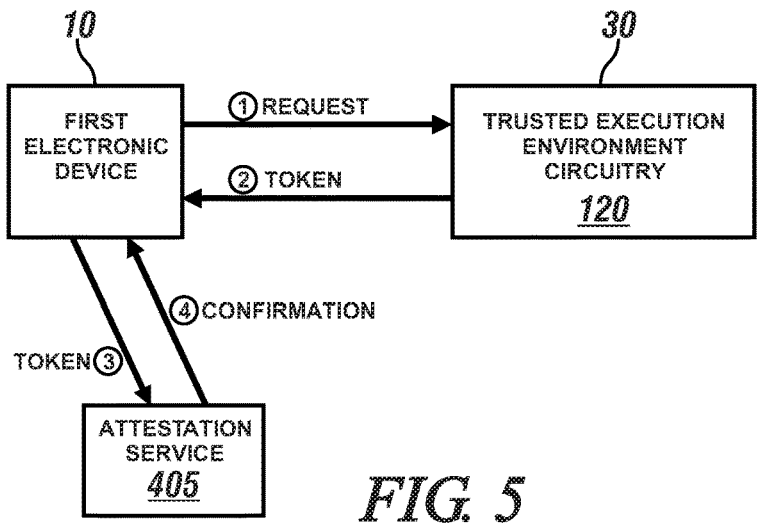
FIG. 5 schematically illustrates an attestation process employed by an electronic device for communicating with a TEE that includes a third-party attestation service, in accordance with the disclosure.

FIG. 5 schematically illustrates an attestation process to allow an electronic device communicating with a TEE to have confidence that the TEE is functioning as expected, and has not had its behavior modified, e.g., by malware. The process may be performed within a system including an embodiment of the first electronic device 10 and router 30 with associated TEE 120 that has been described with reference to FIG. 1. The system described herein includes the first electronic device 10 and router 30 with associated TEE 120, and attestation service 405. The attestation service 405 may be a third-party attestation service which is trusted by the first electronic device 10. For example, it may be provided by a trusted manufacturer of the TEE 120, or another trusted authority.

As a first step (Step 1), the first electronic device 10 transmits an attestation request to the TEE 120. This may be performed as part of a handshake procedure, such as one of the handshake procedures described above.

In response to the attestation request, the TEE 120 transmits an attestation token to the first electronic device 10 (Step 2). The attestation token includes data identifying the TEE 120, and a cryptographic hash of computer program instructions to be executed by the TEE 120 and any initial data to be provided as inputs to the computer program instructions. The first electronic device 10 transmits the attestation token to the attestation service 405 (Step 3). The attestation service 405 verifies the attestation token, to confirm that the computer program instructions and initial data to be executed by the TEE 120 are as expected and have not been modified. The attestation service 405 transmits a confirmation of this verification to the first electronic device 10 (Step 4). The first electronic device 10 can thereby trust the TEE 120, and trust that it will behave as expected. In other examples, attestation may be performed using a different process. For example, in some implementations, no attestation service is used and the first electronic device 10 verifies the attestation token itself.

The operation described with reference to FIGS. 3, 4 and 5 includes transmitting a handshake message from the first electronic device to the second electronic device, generating a session key for the cryptographically secured channel based on the handshake message, and encrypting and decrypting, via the session key, the traffic for transmission between the first and second electronic devices via the ad hoc path.

Figure 6:
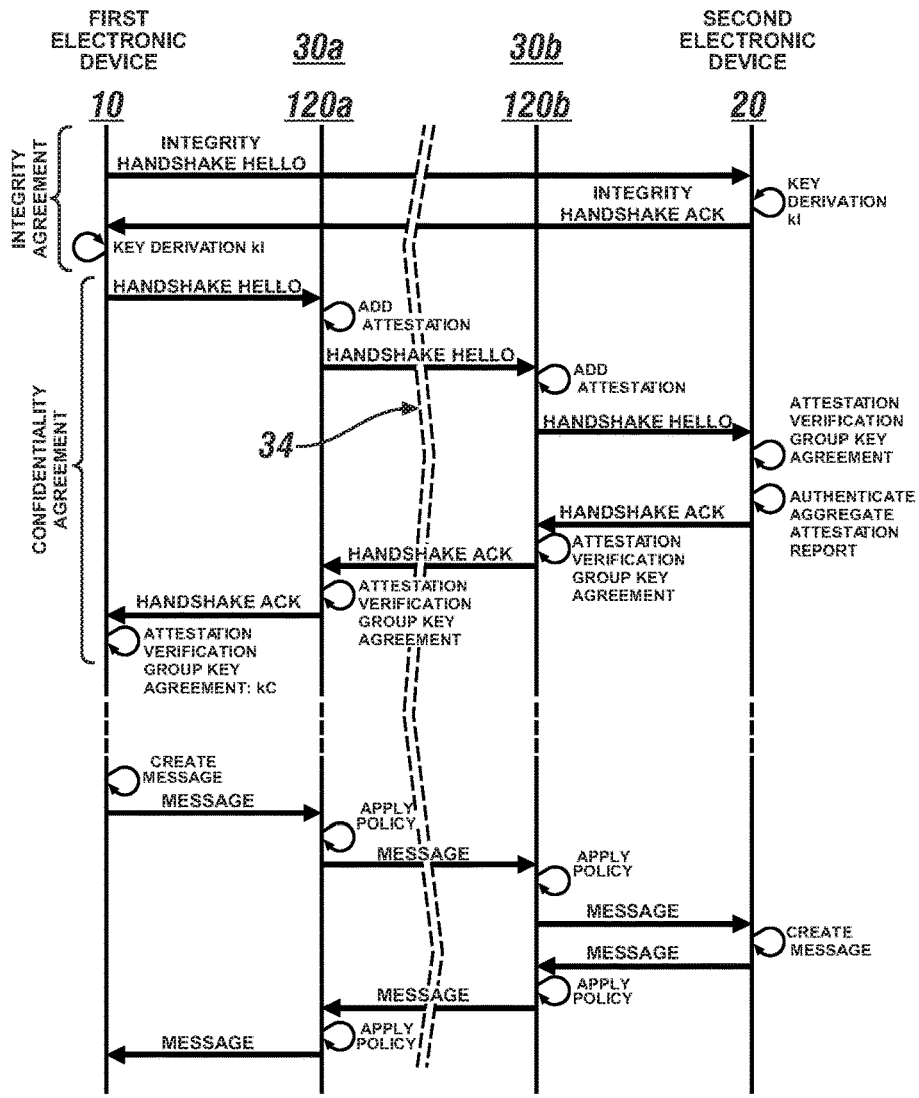
FIG. 6 schematically illustrates a process by which attestation can be performed as part of a handshake process between a first electronic device and a second electronic device via an ad hoc path formed in a network of a plurality of routers that each employ a TEE, in accordance with the disclosure.

Referring now to FIG. 6, with continued reference to the elements described with reference to FIG. 1, a process by which attestation can be performed as part of a handshake process is illustrated. The system includes the first electronic device 10 and the second electronic device 20, which communicate via an embodiment of the network 50 that includes a plurality of the routers 30, wherein a subset of the plurality of the routers 30 form the ad hoc path 54, as described with reference to FIGS. 1 and 2. The first electronic device 10 is in communication with first router 30a including TEE 120a and the second electronic device 20 is in communication with the second router 30b including TEE 120b. Any quantity of similarly situated routers including TEEs may be employed between the first and second electronic devices 10, 20 and form the ad hoc path 54, and are indicated by element 34. The attestation and filtering policy functions described herein are performed by each of the TEEs 120 of the corresponding routers 30.

The process begins with an integrity agreement, for which the first electronic device 10 sends an integrity handshake hello message to the second electronic device 20, and the second electronic device 20 responds with an integrity handshake acknowledgement message. This may for example proceed along the lines of a Diffie-Hellman key exchange. Based on this, the first and second electronic devices 10, 20 derive a shared integrity key kI.

The process then proceeds with the establishment of a confidentiality agreement.

The first electronic device 10 derives a cryptographic nonce from kI and transmits a handshake hello message, including the nonce, via the ad hoc path 54 to the second electronic device 20. Each of the TEEs 120 associated with the plurality of routers 30 of the ad hoc path 54 treats the handshake hello message as an attestation challenge and adds an attestation report to the handshake hello message, using the handshake nonce, before forwarding the handshake hello message to the next participant.

The second electronic device 20 verifies the attestation reports and performs a group key agreement to derive a group shared secret. In some examples, the second electronic device 20 adds authentication information to the group of attestation reports, such as a cryptographic signature or message authentication code.

The second electronic device 20 then responds to the handshake hello message with a handshake acknowledgement message, which may for example be similar to the handshake response message discussed above with reference to FIGS. 3 and 4. The second electronic device 20 appends the attestation reports to the handshake acknowledgement message.

The handshake acknowledgement message is transmitted to the first electronic device 10, via the TEEs 120 associated with the plurality of routers 30 of the ad hoc path 54. Each of the plurality of routers 30 of the ad hoc path 54 may optionally verify the attestation reports, apply any relevant participation policy (defining which entities are allowed to take part in a communication session), and perform the group key agreement to derive the shared group secret.

The first electronic device 10 receives the handshake acknowledgement message and verifies the attestation reports. It then performs the group key agreement to derive the shared group secret. The first electronic device 10 can then determine whether or not to proceed with the connection, based on the participants. If it determines to proceed with the connection, the first electronic device 10 derives a shared cryptographic key, kC, based on the shared secret. At this point, an encrypted communication channel between the first electronic device 10 and the second electronic device 20 can be considered open, with the functionality of the TEEs 120 associated with the plurality of routers 30 of the ad hoc path 54 having been attested and verified.

At a later time, the first electronic device 10 generates traffic 55 for transmitting to the second electronic device 20. This message is encapsulated in an authentication wrapper based on kI, and encrypted using kC. The first electronic device 10 transmits the message to the second electronic device 20 via the TEEs 120 associated with the plurality of routers 30 of the ad hoc path 54. Each of the TEEs 120 decrypts the message using kC, and applies filtering policies to determine whether to forward the message or block its transmission. Similarly, the same process applies in reverse when the second electronic device 20 generates traffic 55 for transmission to the first electronic device 10. This process, with the combination of kI and kC, allows various beneficial properties. In particular, only the first and second electronic devices 10, 20 can properly authenticate messages with kI. All parties are also made aware of all participants in the communication.

A secure routing protocol is executed in each of the TEEs 120, which can attest to peer routers, thus forming the trusted overlay routing network. Each of the TEEs 120 establishes TLS connections to its peer TEEs 120, which is facilitated by the TLS channels being terminated inside the TEE. The peer TEEs are able to discover each other and cooperate to define the ad hoc path 54. Because the TEE routing program is trusted, a client of the network 50 in the form of an electronic device for which anonymity is to be ensured can reveal the source and destination addresses, without risk that the source and destination addresses will be revealed outside of the TEE environment. As such, the cost for the endpoints, in terms of computation and time to establish a network, is reduced, while preserving or increasing the same level of anonymity.

In one or more embodiments, the method includes the traffic being subject to a configurable policy, wherein the generation of the ad hoc path is further based upon the configurable policy.

In one or more embodiments, the method includes the configurable policy being a geographic-specific policy associated with the routers, wherein the generation of the ad hoc path is further based upon the geographic-specific policy.

In one or more embodiments, the method includes the geographic-specific policy associated with the routers being an exclusion policy to avoid any of the plurality of routers that are located within borders of a selected country, wherein the generation of the ad hoc path is further based upon the exclusion policy.

In one or more embodiments, the method includes the geographic-specific policy associated with the routers being an inclusion policy to employ only a subset of the plurality of routers that are located within borders of a selected country, wherein the generation of the ad hoc path is further based upon the inclusion policy.

In one or more embodiments, the method includes the configurable policy being a quantity policy associated with a minimum quantity of the routers, wherein the generation of the ad hoc path is further based upon the quantity policy.

In one or more embodiments, the method includes the configurable policy being a randomization policy associated with a route randomization protocol, wherein the generation of the ad hoc path is further based upon the route randomization protocol.

In one or more embodiments, the method includes the policy being an entity-specific policy associated with a subset of the plurality of routers that are associated with a specific entity, wherein the generation of the ad hoc path is further based upon the entity-specific policy.

In one or more embodiments, the method includes the entity-specific policy associated with the routers being a first association policy to employ only a subset of the plurality of routers that are associated with the specific entity, wherein the generation of the ad hoc path is further based upon the first association policy.

In one or more embodiments, the method includes the entity-specific policy associated with the routers being a second association policy to employ only a subset of the plurality of routers that are not associated with a specific entity, wherein the generation of the ad hoc path is further based upon the second association policy.

In one or more embodiments, the method includes executing, for each of the plurality of routers of the network, via the attestation circuitry of the TEE, the attestation procedure by executing an integrity agreement, establishing a confidentiality agreement, and opening an encrypted communication channel therebetween.

In one or more embodiments, the method includes the network being a trusted overlay routing network, wherein relay nodes of the trusted overlay routing network are hosted within the TEEs of the plurality of routers.

In one or more embodiments, the method includes executing, for each of the plurality of routers of the network, via the attestation circuitry of the TEE, the attestation procedure to form a secure communication channel to another of the plurality of routers via a respective one of the cryptographically secured channels.

In one or more embodiments, the method includes forming the cryptographically secured channel between individual pairs of the plurality of routers being forming a transportation layer security (TLS) channel between individual pairs of the plurality of routers.

In one or more embodiments, the method includes transmitting a handshake message from the first electronic device to the second electronic device, generating a session key for the cryptographically secured channel based on the handshake message, and encrypting and decrypting, via the session key, the traffic for transmission between the first and second electronic devices via the ad hoc path.

In one or more embodiments, the system includes at least one of the first electronic device and the second electronic device being a hand-held device.

In one or more embodiments, the system includes at least one of the first electronic device and the second electronic device being disposed on a vehicle.

In one or more embodiments, the router includes the cryptographically secured channel formed between individual pairs of the plurality of routers being a transportation layer security (TLS) channel formed between individual pairs of the plurality of routers.

While the best modes for carrying out the disclosure have been described in detail, those familiar with the art to which this disclosure relates will recognize various alternative designs and embodiments for practicing the disclosure within the scope of the appended claims.

What is claimed is:

1. A method for routing traffic between a first electronic device and a second electronic device, the method comprising:
coupling the first electronic device and the second electronic device to a network, the network including a plurality of routers;
wherein each of the plurality of routers includes a trusted execution environment (TEE) circuit, and wherein the TEE includes a secure routing protocol, a routing table, and an attestation circuitry;
forming a plurality of cryptographically secured channel, wherein each of the cryptographically secured channels is formed between individual pairs of the plurality of routers, and wherein each of the cryptographically secured channels terminates at the TEE of each of the routers of each of the individual pairs of the plurality of routers;
executing, for each of the plurality of routers of the network, an attestation procedure via the attestation circuitry of the TEE of the respective router;
generating an ad hoc path within the network between the first electronic device and the second electronic device based upon the secure routing protocol, the routing table, and the attestation procedure for each of the plurality of routers of the network, wherein the ad hoc path includes a subset of the plurality of routers of the network and a subset of the plurality of cryptographically secured channels; and
routing the traffic between the first electronic device and the second electronic device via the ad hoc path within the network.

2. The method of claim 1, wherein the traffic is subject to a configurable policy, and wherein the generation of the ad hoc path is further based upon the configurable policy.

3. The method of claim 2, wherein the configurable policy comprises a geographic-specific policy associated with the routers; and
wherein the generation of the ad hoc path is further based upon the geographic-specific policy.

4. The method of claim 3, wherein the geographic-specific policy associated with the routers comprises an exclusion policy to avoid any of the plurality of routers that are located within borders of a selected country; and
wherein the generation of the ad hoc path is further based upon the exclusion policy.

5. The method of claim 3, wherein the geographic-specific policy associated with the routers comprises an inclusion policy to employ only a subset of the plurality of routers that are located within borders of a selected country; and
wherein the generation of the ad hoc path is further based upon the inclusion policy.

6. The method of claim 2, wherein the configurable policy comprises a quantity policy associated with a minimum quantity of the routers; and
wherein the generation of the ad hoc path is further based upon the quantity policy.

7. The method of claim 2, wherein the configurable policy comprises a randomization policy associated with a route randomization protocol; and
wherein the generation of the ad hoc path is further based upon the route randomization protocol.

8. The method of claim 2, wherein the policy comprises an entity-specific policy associated with a subset of the plurality of routers that are associated with a specific entity; and
wherein the generation of the ad hoc path is further based upon the entity-specific policy.

9. The method of claim 8, wherein the entity-specific policy associated with the routers comprises a first association policy to employ only a subset of the plurality of routers that are associated with the specific entity; and
wherein the generation of the ad hoc path is further based upon the first association policy.

10. The method of claim 8, wherein the entity-specific policy associated with the routers comprises a second association policy to employ only a subset of the plurality of routers that are not associated with a specific entity; and
wherein the generation of the ad hoc path is further based upon the second association policy.

11. The method of claim 1, wherein executing, for each of the plurality of routers of the network, via the attestation circuitry of the TEE, the attestation procedure comprises:
executing an integrity agreement,
establishing a confidentiality agreement, and
opening an encrypted communication channel therebetween.

12. The method of claim 1, wherein the network comprises a trusted overlay routing network, and wherein relay nodes of the trusted overlay routing network are hosted within the TEEs of the plurality of routers.

13. The method of claim 1, wherein executing, for each of the plurality of routers of the network, via the attestation circuitry of the TEE, the attestation procedure comprises executing, for each of the plurality of routers of the network, via the attestation circuitry of the TEE, the attestation procedure to form a secure communication channel to another of the plurality of routers via a respective one of the cryptographically secured channels.

14. The method of claim 1, wherein forming the cryptographically secured channel between individual pairs of the plurality of routers comprises forming a transportation layer security (TLS) channel between individual pairs of the plurality of routers.

15. The method of claim 1, further comprising:
transmitting a handshake message from the first electronic device to the second electronic device;

generating a session key for the cryptographically secured channel based on the handshake message; and encrypting and decrypting, via the session key, the traffic for transmission between the first and second electronic devices via the ad hoc path.

16. A system for routing traffic between a first electronic device and a second electronic device, the system comprising:
- a network, including a plurality of routers, and configured to communicate with the first electronic device and the second electronic device;
- wherein each of the plurality of routers includes a trusted execution environment (TEE) circuit, wherein the TEE includes a secure routing protocol, a routing table, and an attestation circuitry; and
- wherein a plurality of cryptographically secured channels is formed between individual pairs of the plurality of routers, wherein each of the cryptographically secured channels terminates at the TEE of the respective router for each of the individual pairs of the plurality of routers;
- wherein the attestation circuitry of the TEE executes, for each of the plurality of routers of the network, an attestation procedure;
- wherein an ad hoc path is generated within the network between the first electronic device and the second electronic device based upon the secure routing protocol, the routing table, and the attestation procedure for each of the plurality of routers of the network;
- wherein the ad hoc path includes a subset of the plurality of routers of the network and a subset of the cryptographically secured channels; and
- wherein the traffic is routed between the first electronic device and the second electronic device via the ad hoc path within the network.

17. The system of claim 16, wherein at least one of the first electronic device and the second electronic device comprises a hand-held device.

18. The system of claim 16, wherein at least one of the first electronic device and the second electronic device is disposed on a vehicle.

19. A router comprising:
- a trusted execution environment (TEE) circuit that includes a secure routing protocol, a routing table, and an attestation circuitry;
- wherein the attestation circuitry of the TEE executes an attestation procedure;
- wherein the router is one of a plurality of routers that form a network;
- wherein a cryptographically secured channel is formed between the router and another of the plurality of routers; and
- wherein the cryptographically secured channel terminates at the TEE of the router.

20. The router of claim 19, wherein the cryptographically secured channel formed between individual pairs of the plurality of routers comprises a transportation layer security (TLS) channel formed between individual pairs of the plurality of routers.

* * * * *